United States Patent [19]

Hernandez-Mena et al.

[11] Patent Number: 5,695,652
[45] Date of Patent: Dec. 9, 1997

[54] METHODS FOR INHIBITING THE PRODUCTION OF SLIME IN AQUEOUS SYSTEMS

[75] Inventors: Roy Hernandez-Mena, The Woodlands, Tex.; Richard J. Sujdak, Yardley, Pa.

[73] Assignee: BetzDearborn Inc., Trevose, Pa.

[21] Appl. No.: 791,797

[22] Filed: Jan. 29, 1997

Related U.S. Application Data

[63] Continuation-in-part of Ser. No. 568,070, Dec. 6, 1995, abandoned.

[51] Int. Cl.$^6$ ................................................ C02F 1/50
[52] U.S. Cl. .................. 210/764; 210/170; 210/747; 252/181; 514/25; 514/456; 510/249; 424/195.1
[58] Field of Search .................. 210/764, 170, 210/747; 252/181; 424/195.1; 510/249; 514/25, 456

[56] References Cited

U.S. PATENT DOCUMENTS

| | | | |
|---|---|---|---|
| 47,794 | 5/1865 | Buzby | 510/249 |
| 61,364 | 1/1867 | Sellers | 510/249 |
| 277,122 | 5/1883 | Downie | 510/249 |
| 728,258 | 5/1903 | Lockwood | 510/249 |
| 2,046,614 | 7/1936 | Sandusky | 210/764 |
| 3,250,667 | 5/1966 | Legator | 210/764 |
| 3,879,288 | 4/1975 | Siegele | 210/58 |
| 3,917,530 | 11/1975 | Boske | 210/170 |
| 3,931,038 | 1/1976 | Mochi-Bartolani | 252/181 |
| 3,936,380 | 2/1976 | Boske | 210/170 |
| 4,105,784 | 8/1978 | Okada | 424/283 |
| 4,190,463 | 2/1980 | Kaplan | 134/3 |
| 4,337,313 | 6/1982 | Hershberger et al. | 435/177 |
| 4,558,080 | 12/1985 | Quamme et al. | 210/723 |
| 4,613,672 | 9/1986 | Hara | 549/399 |
| 4,673,509 | 6/1987 | Davis et al. | 210/699 |
| 4,692,316 | 9/1987 | Greaves et al. | 422/16 |
| 4,692,317 | 9/1987 | Greaves | 422/15 |
| 4,734,216 | 3/1988 | Kelly et al. | 510/249 |
| 4,760,088 | 7/1988 | Laks | 514/456 |
| 4,906,656 | 3/1990 | Laks | 514/456 |
| 4,964,952 | 10/1990 | Bennison et al. | 162/158 |
| 4,988,545 | 1/1991 | Laks | 427/440 |
| 4,999,197 | 3/1991 | Wursch | 424/195.1 |
| 5,158,711 | 10/1992 | Shirato et al. | 252/631 |
| 5,238,572 | 8/1993 | Hernandez-Mena et al. | 210/632 |
| 5,256,304 | 10/1993 | Meyer et al. | 210/708 |
| 5,433,863 | 7/1995 | Braden et al. | 210/708 |

FOREIGN PATENT DOCUMENTS 354889   2/1990   European Pat. Off. .

OTHER PUBLICATIONS

"Oolong Tea Polyphenols Inhibit Experimental Dental Caries in SPF Rats Infected with Mutans Streptocci", Caries Res. 1993; 27:124–129.
"Sargassum Tannin, An Antibiotic Which Retards Fouling", Sieburth et al., Nature, vol. 208, Oct. 2, 1965, pp. 52–53.
"Toxicity of Tannin Compounds to Microorganisms", Field et al., Plant Polyphenols, R. W. Hemingway Ed. 1992, pp. 673–692.
"Antibacterial Substances in Japanese Green Tea Extract Against Streptococcus Mutans, A Cariogenic Bacterium", Tanaka et al., Agric. Biol. Chem., 53 (9) 2307–2311, 1989.
"The Bactericidal Activity of Tea and Coffee", Toda et al., Letters in Applied Microbiology 1989, 8, 123–125.
"Antimicrobial Properties of Tannins", Scalbert, Phytochemistry, vol. 30, No. 12, pp. 3875–3883, 1991.
"Antimicrobial Activity of Green Tea Flavor Compounds and Their Combination Effects", J. Agric. Food Chemic. 1992, 40, 245–248.
"The Antifouling Activity of Natural and Synthetic Phenolic Acid Sulphate Esters", Todd et al. Phytochemistry, vol. 34, No. 2, pp. 401–404, 1993.

*Primary Examiner*—Cynthia L. Nessler
*Attorney, Agent, or Firm*—Alexander D. Ricci; Philip H. Von Neida

[57] ABSTRACT

Methods for inhibiting the attachment of microbes to surfaces in aqueous systems are disclosed. Tea extracts and/or tannins are added to aqueous systems, such as papermaking and cooling water systems, to inhibit microbial attachment to surfaces which cause slime formation problems

13 Claims, No Drawings

5,695,652

METHODS FOR INHIBITING THE PRODUCTION OF SLIME IN AQUEOUS SYSTEMS

This is a continuation-in-part of Ser. No. 08/568,070, filed Dec. 6, 1995.

FIELD OF THE INVENTION

The present invention relates to methods for inhibiting the formation of slime by microorganisms in industrial aqueous systems. This method is directed towards inhibiting the attachment of microorganisms to the surfaces of industrial aqueous systems.

BACKGROUND OF THE INVENTION

Microorganisms and the slimes they produce are responsible for the formation of deposits in papermaking and industrial cooling water systems. Bacterial slimes are composed of exopolysaccharides (EPS) which exist as capsules or slime layers outside of the cell walls. When these slimes form on surfaces in paper or cooling systems, they trap organic and inorganic components and debris present in the process waters. As the microorganisms grow within paper system deposits, portions of the deposit may detach from the surface and cause paper breaks and spots in produced paper, which reduces the paper quality and increases machine downtime. Microbial growth and slime formation in cooling systems results in reduced heat exchange caused by biofouling and plugging of heat exchanger tubes, excessive fouling of the cooling water, tower decks and fill, and is a potential cause of under-deposit corrosion.

The term "slime" is a broad one covering a wide range of viscous, mucous, or leathery materials and mixtures found in industrial waters. Slimes are polymeric in nature and can be broadly classified as chemical, biological, or composite slimes depending upon their cause or composition. For example, raw materials and equipment used in the paper industry are not sterile and water used in conjunction with such equipment is continuously being contaminated with a wide variety of microorganisms from such sources as wood pulp, chemicals, air, makeup water, and the like. The growth of certain specific forms of these biological contaminants causes or produces polymeric excretions or products that are or become slime.

Historically, slime formation has been treated by the addition to industrial waters (e.g., white water associated with the pulp and paper industry) of slimicides. The purpose of these slimicides is to destroy or arrest the growth of some of the many organisms present in the water to thereby prevent or retard the formation of slime. Chemicals used as slimicicles have included chlorine, phenylmercuric acetate, pentachlorophenol, tributyl tin oxide, and isothiocyanates, all of which are relatively toxic to humans.

Microbially produced exopolysaccharides can build up, retard heat transfer and restrict water flow through cooling water systems. Controlling slime-forming bacteria by applying toxic chemicals is becoming increasingly unaccepted due to environmental problems. In addition, the efficacy of the toxicants is minimized by the slime itself, since the extracellular polysaccharide surrounding microorganisms impedes toxicant penetration.

Toxicants cannot adequately control large populations of attached bacteria and they are effective mainly against suspended microorganisms. Although surfactants and dispersants which penetrate and help loosen slime can enhance the activity of toxicants, they are nonspecific and may have deleterious effects on the industrial process or the environment.

Recently, methods directed at controlling microbial slimes include the use of enzymes. These approaches attempt to disrupt the attachment process so that slime formation is prevented, or by hydrolyzing the exopolysaccharide (EPS) produced by the microorganisms, after attachment. Using an enzyme to control slime will require knowledge of the composition of the slime, so that an appropriate enzyme-substrate combination is employed.

SUMMARY OF THE INVENTION

The present invention relates to methods for inhibiting the formation of slime in industrial aqueous systems such as papermaking and cooling water systems. The slime formation is inhibited by preventing the attachment of microorganisms to the surfaces of the aqueous systems where the slime-producing bacteria are present. It has been found that the addition of tea extracts and tannins to these aqueous systems inhibit the attachment of microorganisms, particularly bacteria.

These methods effectively inhibit the attachment of microorganisms to exposed surfaces while not killing the microorganisms. The addition of the tannin or tea extract to the aqueous system will inhibit attachment of microorganisms while not inhibiting their viability.

DESCRIPTION OF THE RELATED ART

"Oolong Tea Polyphenols Inhibit Experimental Dental Caries in SPF Rats Infected with Mutans Streptococci," T. Ooshima et al., Caries Res 27:124–129, 1993, discusses the inhibitory effects of Oolong tea extracts derived from *Camellia sinensis* on dental caries in specific pathogen-free rats. This study indicated that Oolong tea extracts contain polyphenols and inhibit insoluble glucan synthesis by inhibiting glucosyltransferases (GTases) and the sucrose-dependent cell adherence of *Streptococcus mutans*.

"Toxicity of Tannic Compounds to Microorganisms", Field et al., Plant Polyphenols, 1992, pp. 673–692 discusses the toxicity of tannins to microorganisms by their hydrogen bonding with proteins. Toda et al. in "The Bactericidal Activity of Tea and Coffee", Letters in Applied Microbiology, 1989, 8, 123–125 demonstrates that extracts of black tea, green tea, pu-erh tea and coffee inhibited the growth and exhibited bactericidal activity against various bacteria.

U.S. Pat. No. 4,760,088 teaches that sulfide derivatives of catechins that are derived from condensed tannins possess biocidal activity. These sulfides which are prepared by reacting condensed tannin with a thiol compound under mild acidic conditions are effective biocides against wood destroying fungi and gram-positive bacteria.

The antifouling properties of phenolic acid sulphates isolated from marine organisms is discussed in "The Antifouling Activity of Natural and Synthetic Phenolic Acid Sulphate Esters," J. S. Todd et al., Phytochem 34(2) 401–404, 1993. This study found that p-(sulphooxy) cinnamic acid, isolated from the seagrass *Zoxtera marine*, prevents attachment of marine bacteria and barnacles to artificial surfaces.

U.S. Pat. No. 5,238,572 teaches methods for treating microbial slime in industrial water systems by adding to the water a combination of enzymes specific to the numerous saccharide units that make up the slime forming exopolysaccharide layer. The enzymes comprise galactosidase, galacturonidase, rhamnosidase, xylosidase, fucosidase, arabinosidase, and oc-glucosidase.

U.S. Pat. No. 5,128,100 teaches methods for preventing or inhibiting the adhesion of bacterial cells to surfaces on aqueous systems using a water-soluble ionene polymer. These methods will inhibit the adhesion of bacterial cells without substantially killing them by utilizing the ionene polymers in amounts below the toxic threshold of the polymers.

DETAILED DESCRIPTION OF THE INVENTION

The present invention provides for methods for inhibiting the attachment of microorganisms to the surfaces of aqueous systems while not affecting the viability of said microorganisms comprising adding to the aqueous system an effective inhibiting amount of a tea extract and/or a tannin.

The tea extract in general is derived from the Camellia genus, *Camellia sinensis*. Tea is classified into three types depending on the processing of the tea leaves: nonfermented green tea, semifermented tea, and fermented black tea. The teas useful in the methods of the present invention include but are not limited to nonfermented green teas selected from the group consisting of gun powder tea and pan fried green tea; semi-fermented teas selected from the group consisting of Oolong tea, formosa tea, and lotus tea; and fermented black teas selected from the group consisting of orange pekoe tea, assam tea, darjeeling blend, Turkish tea, and Earl Grey tea. These tea types are well known in the art and are widely commercially available.

Tannin, also called tannic acid, occurs naturally in the leaf, branch, bark and fruit of many plants. As disclosed by A. Pizzi in "Condensed Tannin for Adhesives", Ind. Eng. Chem. Prod. Res. Dev. 1982, 21, pages 359–369, the natural tannins can be classified as "hydrolyzable" and "condensed" tannins. The composition and structure of tannin will vary with the source and the method of extraction, but the empirical structure is given as $C_{76}H_{52}O_{46}$ with many OH groups attached to the aromatic rings. The tannin employed in the present invention is preferably a condensed tannin including but not limited to those tannins derived from Quebracho, Mimosa, and Sumac. The present inventors anticipate that hydrolyzable tannins will also be effective in the present invention.

The tea extracts and tannins will inhibit the attachment of microbes to surfaces in industrial aqueous systems while not affecting the viability of the microbes. By preventing this attachment, the formation of slimes is inhibited. The methods of the present invention are utilized in aqueous systems where microbial slime causes problems. Systems which are particularly susceptible to slime proliferation are papermaking and cooling water systems where poor paper quality, machine downtime and fouled heat exchangers result from slime formation.

The methods claimed are generally applicable to the control of attachment of microorganisms. These microbes include but are not limited to Pseudomonas, Klebsiella, Aerobacter, Acinetobacter, Enterobacter, and Flavobacterium.

The total amount of tea extract and/or tannin used in the methods of the present invention is that amount which is sufficient to inhibit attachment of microbes while not inhibiting the viability of the microbes. This amount will vary according to the conditions of the aqueous system and will be determined by the amount of slime already present, the amount of bacteria present in the aqueous system, the type and nature of surface to be treated, and the pH and temperature of the aqueous system.

Preferably, the total amount of tea extract and/or tannin added to the aqueous system ranges from 62 to 1000 parts per million parts of the aqueous system. More preferably, the range is from about 62 parts to about 125 parts per million parts of the aqueous system.

The tea extract and/or tannin is preferably applied to the aqueous phase in contact with the surface experiencing or having the potential to experience microbial fouling. The tea extract and/or tannin may also be applied directly to the surface experiencing or having the potential to experience microbial fouling.

The tea extract and tannin may be applied individually, as mixtures of tea extracts and mixtures of tannins or as mixtures of both. The tea extract and tannin may be applied neat or as a solution. When a solution is employed, the preferred solvent is water; however, any solvent that is compatible with the tea extract, tannin, and aqueous system to be treated may be employed. The tea extracts and/or tannins may be added in conjunction with biocides and surfactants as an adjunct for a complete program for microbial control of both adhesion and growth.

The invention will now be further described with reference to a number of specific examples which are to be regarded solely as illustrative and not as restricting the scope of the invention.

EXAMPLES

The microbial culture used in the study of bacterial attachment in the following examples was prepared as follows: to a flask containing 50 mL of Simple Salts Medium (SSM) and 3 g/l of glucose was added 50 µl of a solution containing 10 µCi/mL of $^3$H-adenine. The SSM (pH=7) contained:

0.79 g $(NH_4)SO_4$ 0.06 g $MgSO_4$ 1.01 g KCl 3.81 g $KH_2PO_4$ 6.00 g $K_2HPO_4$ 3.00 g glucose 1.0 L deionized $H_2O$ This flask was inoculated with a field isolate identified as *Pseudomonas aeruginosa*. The microbial culture was grown overnight at 37° C. with shaking at 200 rpm. This procedure generated a radio-labeled culture which could be monitored using a scintillation counter.

Following incubation, the culture was centrifuged at 12,000 xg for 15 minutes in a Sorvall (Newtown, Conn.) RC-5 centrifuge. The supernatant was decanted and the culture was re-suspended in SSM to remove any non-incorporated radio-label. Centrifugation was repeated, the supernatant decanted, and the pellet was re-suspended in five mL of SSM. In a side-arm flask containing SSM (approximately 5 to 10 mL), a 300 Klett Unit suspension was prepared by adding an appropriate amount of the cell suspension to the flask. This suspension contained approximately $10^9$ CFU/mL, and was used in the assay described below.

The assay used to test compounds for anti-sessile activity is microplate-based and uses Dynatech Laboratories, Inc. (Chantilly, Va.) Immulon 1 Removawell Strips. Each well in these strips can be removed individually and tested for adhesion of microbes to its surface. In a typical assay, the wells are pre-wetted with 25 µl of SSM for 30 minutes. The test compound is added to six wells of the microplate at a volume per well of 50 µl. This is followed by addition of 50

μl of the radio-labeled cell suspension discussed above. The order of addition can be reversed in order to test whether the compound can remove cells from the surface. Immediately after the final component of the test has been added to the wells, three of the wells are harvested to establish the initial amount of attachment to the polystyrene surface (T=0 hr). Harvesting removes any unattached cells and is accomplished by rinsing the wells with de-ionized water using a Skatron Titertek Cell Harvester (Sterling, Va.). The wells are then placed in scintillation vials, covered, and placed in a boiling water bath for 30 minutes in order to lyse the cells and make the radio-label available for counting. After the vials have cooled, five mL of liquid scintillation fluid is added to the vials and the amount of radio-label is counted in a liquid scintillation counter. The remaining wells are placed on a Fisher Vortex Genie 2 (Pittsburgh, Pa.) (modified to hold a microplate) at a very slow shaking speed. At T=1 hr, the remaining wells are harvested as outlined above. The amount of radio-label is compared with those of wells that were not exposed to any test compound (these are the controls).

The following test utilized 1,000 ppm of Oolong tea extract (final well concentration) added either before or after the addition of the radio-labeled bacteria. The results are presented in Table I.

TABLE I

Attachment of *Pseudomonas aeruginosa* to plastic microplate wells

|  | Average CPM |  | % Attachment |  |
| --- | --- | --- | --- | --- |
| Organisms added first |  |  |  |  |
| Time (hours) | 0 | 1 | 0 | 1 |
| Control | 2,674 | 5,049 | — | — |
| Oolong tea extract | 1,596 | 2,053 | 60% | 41% |
| Chemicals added first |  |  |  |  |
| Time (hours) | 0 | 1 | 0 | 1 |
| Control | 2,340 | 3,205 | — | — |
| Oolong tea extract | 228 | 72 | 10% | 2% |

As seen in Table I, only 41% of the cells attached to the surface of the wells compared to the control. When the chemical was added first, only 2% of the bacteria in the test wells attached.

The following example tested for the inhibition of bacterial attachment as a function of Oolong tea extract added before and after the addition of the radio-labeled microbes. Incubation time was one hour. These results are presented in Table II.

TABLE II

Attachment of *Pseudomonas aeruginosa* to plastic microplate wells

| Dosage Oolong Tea Extract (ppm) | % Attached |
| --- | --- |
| Organisms added first |  |
| 31 | 106 |
| 62 | 68 |
| 125 | 54 |
| 250 | 58 |
| 500 | 60 |
| 1000 | 64 |

TABLE II-continued

Attachment of *Pseudomonas aeruginosa* to plastic microplate wells

| Dosage Oolong Tea Extract (ppm) | % Attached |
| --- | --- |
| Chemicals added first |  |
| 31 | 78 |
| 62 | 46 |
| 125 | 14 |
| 250 | 5 |
| 500 | 3 |
| 1000 | 2 |

In the following example, Oolong tea extract, Mimosa tannin and Quebracho tannin were tested for their ability to inhibit the attachment of microbes to surfaces. Incubation time for the assay was one hour. Results are presented in Table III.

TABLE III

Attachment of *Pseudomonas aeruginosa* to plastic microtiter wells

| Inhibitor(ppm) |  | % Attached |
| --- | --- | --- |
| -chemicals added first |  |  |
| Oolong tea extract | ( 62) | 36 |
|  | (125) | 8 |
|  | (250) | 1 |
|  | (500) | 1 |
| Mimosa tannin | ( 62) | 20 |
|  | (125) | 11 |
|  | (250) | 6 |
|  | (500) | 3 |
| Quebracho tannin | ( 62) | 78 |
|  | (125) | 56 |
|  | (250) | 26 |
|  | (500) | 18 |

The following example shows the effect of the inhibitor compounds on the attachment of the test organism when the radio-labeled bacteria are added prior to the addition of the test compounds. The time of the assay was one hour. Test results are shown in Table IV.

TABLE IV

Attachment of *Pseudomonas aeruginosa* to plastic microtiter wells

| Inhibitor (ppm) |  | % Attached |
| --- | --- | --- |
| -microbes added first |  |  |
| Oolong tea extract | ( 62) | 56 |
|  | (125) | 28 |
|  | (250) | 33 |
|  | (500) | 36 |
| Mimosa tannin | ( 62) | 61 |
|  | (125) | 50 |
|  | (250) | 56 |
|  | (500) | 50 |
| Quebracho tannin | ( 62) | 80 |
|  | (125) | 40 |
|  | (250) | 27 |
|  | (500) | 35 |

Additional studies were performed using a variety of tea extracts. Teas were extracted using a 45% v/v ethanol (95%)/$H_2O$ solution. Total volume used depended on amount of tea available for extraction and the absorbency of the tea leaves. Typically, 20 grams of tea were extracted using 200 mL of the ethanol/water solution. Only three of the teas required additional liquid: Formosa, pan fried green, and assam.

All extractions were conducted in beakers with stir bars, covered with watch glasses, and allowed to stir on a magnetic plate for three hours. After extraction, the beakers were covered with parafilm and refrigerated overnight. The liquid from each extraction was recovered by filtration through standard coffee filters. The liquid recovered was frozen and lyophilized overnight.

After drying, the remaining tea extract (now in powder form) was scraped off the sides of the flasks and crushed using mortar and pestle. All powders recovered were placed in amber bottles and stored in a dessicator until used.

In the following example, a number of tea extracts, tested at 500 ppm final well concentration, were added to microplate wells before addition of the radio-labeled bacteria. Results are shown in Table V. The test procedure employed was that used in Examples 1 through 4.

TABLE V

Attachment of *Pseudomonas aerginosa* to plastic microtiter wells

| TeaType | Tea | Average CPM | % Attachment |
|---|---|---|---|
| -chemicals added first | | | |
| Semi-Fermented Teas | Oolong (1) | 98 | 2 |
| | Oolong (2) | 83 | 2 |
| | Oolong (3) | 122 | 3 |
| | Formosa | 72 | 2 |
| | Lotus[a] | 114 | 3 |
| Fermented Black Teas | Assam tea | 160 | 4 |
| | Darjeeling blend | 201 | 4 |
| | Earl Grey[b] | 118 | 3 |
| Green teas | Gun powder | 119 | 3 |
| | Pan fried green tea[c] | 104 | 2 |
| | Control | 4,492 | 100 |

[a]contains Oolong and lotus leaves.
[b]also contains Oil of Bergamot.
[c]treated with heat.

As seen in Table V, a variety of different tea extracts controlled the attachment of microbes.

In the following example, a number of tannins from different sources were tested using the same procedures employed in Examples 1–5, at 500 ppm final well concentration. The tannins were added to the test well prior to the radio-labeled bacteria. Test results are shown in Table VI.

TABLE VI

Attachment of *Pseudomonas aeruginosa* to plastic microtiter wells

| Tannin | Average CPM | % Attachment |
|---|---|---|
| -chemicals added first | | |
| Wattle (Mimosa) | 500 | 11 |
| Mimosa Abbey color | 513 | 11 |
| Gambier Abbey color | 808 | 18 |
| Quebracho Abbey color | 986 | 22 |
| Sumac Abbey color | 2,897 | 64 |
| Control | 4,492 | 100 |

These results indicated that other tannins also proved effective at inhibiting the attachment of bacteria.

In the following example, Orange Pekoe tea extract was tested for its ability to prevent attachment of the test organism at various concentrations. The testing procedure was similar to that described for Table II. Test results are presented in Table VII.

TABLE VII

Attachment of *Pseudomonas aeruginosa* to plastic microtiter wells

| Tea Attachment | Concentration (ppm) | Average CPM | % |
|---|---|---|---|
| - chemicals added first | | | |
| Orange Pekoe Tea Extract | 63 | 252.43 | 11 |
| | 125 | 106.20 | 5 |
| | 250 | 65.30 | 3 |
| | 500 | 72.77 | 3 |
| Control | — | 2,322.57 | |

In attempting to determine the mechanism by which the tannis or teas inhibit the attachment process, studies were conducted to determine whether tannins or teas affect the viability of the microbial population. These studies utilized microbial populations obtained from industrial cooling towers. These experiments were conducted in 125 mL Edenmeyer flasks containing 50 mL of cooling tower water amended with the appropriate amount of test material. The flasks were incubated for periods of four and twenty-four hours. At prescribed times, samples were withdrawn from the test flasks and standard plate counts were performed. In addition to flasks containing either tea extract or tannin, flasks containing a biocide, methylene bis(thio)cyanate (MBT), were run as a reference control for the population. The results of these studies appear in Tables VIII and IX.

TABLE VIII

Standard Toxicant Evaluation
Mideastern Aluminum Mill
Cooling Tower Sample

| | Dosage | CFU/mL | | | % Inhibition | |
|---|---|---|---|---|---|---|
| Inhibitor | (ppm) | T = 0 | T = 4 hrs | T = 24 hrs | T = 4 hrs | T = 24 hrs |
| Control | — | 3.00E + 05 | 2.47E + 06 | 3.56E + 07 | | |
| Control | — | 4.50E + 05 | 1.50E + 06 | 2.44E + 07 | | |
| Average | — | 3.75E + 05 | 1.99E + 06 | 3.00E + 07 | | |
| MBT | 5 | | 0.00E + 00 | 0.00E + 00 | 100 | 100 |
| Oolong | 500 | | 7.00E + 05 | 1.20E + 08 | 65 | −300 |
| | 250 | | 1.70E + 06 | 3.84E + 07 | 14 | −28 |
| | 62.5 | | 9.70E + 05 | 3.22E + 07 | 51 | −7 |

TABLE VIII-continued

Standard Toxicant Evaluation
Mideastern Aluminum Mill
Cooling Tower Sample

| Inhibitor | Dosage (ppm) | CFU/mL T = 0 | CFU/mL T = 4 hrs | CFU/mL T = 24 hrs | % Inhibition T = 4 hrs | % Inhibition T = 24 hrs |
|---|---|---|---|---|---|---|
|  | 12.5 |  | 4.30E + 05 | 3.22E + 07 | 78 | −7 |
| Mimosa | 500 |  | 1.00E + 04 | 7.40E + 07 | 99 | −147 |
|  | 250 |  | 3.20E + 05 | 3.06E + 07 | 84 | −2 |
|  | 62.5 |  | 6.80E + 05 | 3.42E + 07 | 66 | −14 |
|  | 12.5 |  | 3.68E + 06 | 2.80E + 07 | −85 | 7 |
| Quebracho | 500 |  | 7.60E + 05 | 2.16E + 07 | 62 | 28 |
|  | 250 |  | 1.87E + 06 | 2.24E + 07 | 6 | 25 |
|  | 62.5 |  | 1.77E + 06 | 2.54E + 07 | 11 | 15 |
|  | 12.5 |  | 2.50E + 06 | 3.10E + 07 | −26 | −3 |
| Sumac | 500 |  | 1.43E + 06 | 2.40E + 07 | 28 | 20 |
|  | 250 |  | 1.05E + 06 | 2.66E + 07 | 47 | 11 |
|  | 62.5 |  | 1.70E + 06 | 2.78E + 07 | 14 | 7 |
|  | 12.5 |  | 1.07E + 06 | 2.14E + 07 | 46 | 29 |

MBT is methylene bis(thio)cyanate

TABLE IX

Standard Toxicant Evaluation
Southern Manufacturing Company
Process Cooling Tower Sample

| Inhibitor | Dosage (ppm) | CFU/mL T = 0 | CFU/mL T = 4 hrs | CFU/mL T = 24 hrs | % Inhibition T = 4 hrs | % Inhibition T = 24 hrs |
|---|---|---|---|---|---|---|
| Control | — | 8.80E + 05 | 5.50E + 06 | 2.00E + 06 |  |  |
| Control | — | 9.60E + 05 | 4.20E + 06 | 3.52E + 06 |  |  |
| Average | — | 9.20E + 05 | 4.85E + 06 | 2.76E + 06 |  |  |
| MBT | 5 |  | 1.30E + 05 | 4.30E + 05 | 97 | 84 |
| Oolong | 500 |  | 1.10E + 06 | 1.42E + 07 | 77 | −414 |
|  | 250 |  | 8.10E + 05 | 5.80E + 06 | 83 | −110 |
|  | 62.5 |  | 1.30E + 06 | 6.10E + 06 | 73 | −121 |
|  | 12.5 |  | 1.14E + 06 | 5.80E + 06 | 76 | −110 |
| Mimosa | 500 |  | 4.40E + 05 | 1.69E + 07 | 91 | −505 |
|  | 250 |  | 8.40E + 05 | 6.90E + 06 | 83 | −150 |
|  | 62.5 |  | 1.52E + 06 | 3.40E + 06 | 69 | −23 |
|  | 12.5 |  | 4.90E + 06 | 6.20E + 06 | −1 | −125 |
| Quebracho | 500 |  | 8.10E + 06 | 1.17E + 07 | −67 | −324 |
|  | 250 |  | 7.30E + 06 | 7.00E + 06 | −51 | −154 |
|  | 62.5 |  | 5.00E + 06 | 6.50E + 06 | −3 | −136 |
|  | 12.5 |  | 3.30E + 06 | 5.10E + 06 | 32 | −85 |
| Sumac | 500 |  | 2.15E + 06 | 3.60E + 07 | 56 | −1204 |
|  | 250 |  | 7.90E + 06 | 2.90E + 06 | −63 | −5 |
|  | 62.5 |  | 3.20E + 06 | 9.60E + 06 | 34 | −248 |
|  | 12.5 |  | 5.30E + 06 | 6.80A + 06 | −9 | −146 |

MBT is methylene bis(thio)cyanate

Initial results (T=4 Hrs) of the testing presented in Tables VIII and IX suggest that mimosa and oolong both inhibited the growth of the test cultures. The 24 hour data however indicated no microbial inhibition. These data also show enhanced growth at 24 hours compared to the control and demonstrate that in accordance with the present invention the tannins inhibit the adhesion of microbes while not affecting their viability or killing them.

Further studies were conducted to establish that inhibition of attachment was not due to microbial growth inhibition. In these studies inhibition of microbial growth is monitored by measuring the inhibition of uptake of $^{14}C$-glucose by a microbial culture when that culture was exposed to biocidal compounds. The assay employed used an overnight culture of *Pseudomonas aeruginosa* or *Klebsiella pneumoniae* grown in Trypticase Glucose Broth. These cultures were harvested by centrifugation and re-suspended to a optical density of 300 Klett Units. This suspension was placed in microtiter wells containing the test solution, and $^{14}C$-glucose. The culture was allowed to incubate for two hours and the cells were harvested. The uptake of $^{14}C$-glucose by the treated cells was compared to controls with no treatment. MBT was also used as a reference control and to establish the degree to which the culture was inhibited by a biocidal compound. The results of these studies appear in Tables X and XI.

TABLE X

Inhibition of $^{14}$C-Glucose Uptake by *Pseudomonas aeruginosa*

| Compound | Dosage (ppm) | CPM | | | Avg. | St. Dev. | % Inhibition |
|---|---|---|---|---|---|---|---|
| Control | — | 1085 | 1131 | 1095 | 1115 | 37 | |
|  | — | 1169 | 1138 | 1073 | | | |
| MBT | 5 | 138 | 133 | | 136 | 3 | 88 |
| Oolong tea | 500 | 1540 | 1623 | | 1581 | 59 | −42 |
|  | 250 | 1511 | 1625 | | 1568 | 81 | −41 |
|  | 125 | 1155 | 1224 | | 1190 | 49 | −7 |
|  | 63 | 1251 | 1200 | | 1226 | 36 | −10 |
|  | 31 | 1049 | 1216 | | 1132 | 118 | −2 |
|  | 16 | 1185 | 1108 | | 1146 | 55 | −3 |
| Mimosa | 500 | 1264 | 1211 | | 1238 | 38 | −11 |
| tannin | 250 | 1239 | 1344 | | 1292 | 75 | −16 |
|  | 125 | 1105 | 1283 | | 1194 | 125 | −7 |
|  | 63 | 1197 | 1125 | | 1161 | 51 | −4 |
|  | 31 | 918 | 1296 | | 1107 | 267 | 1 |
|  | 16 | 1278 | 1344 | | 1311 | 47 | −18 |
| Quebracho | 500 | 979 | 1155 | | 1067 | 125 | 4 |
| tannin | 250 | 1009 | 1032 | | 1020 | 16 | 9 |
|  | 125 | 920 | 940 | | 930 | 14 | 17 |
|  | 63 | 988 | 949 | | 969 | 28 | 13 |
|  | 31 | 950 | 1039 | | 995 | 63 | 11 |
|  | 16 | 1204 | 1048 | | 1126 | 111 | −1 |
| Sumac | 500 | 744 | 791 | | 768 | 33 | 31 |
|  | 250 | 922 | 901 | | 911 | 15 | 18 |
|  | 125 | 1112 | 1082 | | 1097 | 22 | 2 |
|  | 63 | 1182 | 1163 | | 1173 | 14 | −5 |
|  | 31 | 1102 | 1090 | | 1096 | 8 | 2 |
|  | 16 | 1039 | 1019 | | 1029 | 15 | 8 |
| Gambier | 500 | 1926 | 1928 | | 1927 | 2 | −73 |
|  | 250 | 2023 | 1806 | | 1914 | 153 | −72 |
|  | 125 | 1570 | 1557 | | 1563 | 9 | −40 |
|  | 63 | 1257 | 1361 | | 1309 | 74 | −17 |
|  | 31 | 1079 | 1112 | | 1096 | 23 | 2 |
|  | 16 | 1037 | 1016 | | 1026 | 15 | 8 |

MBT is methylene bis(thio)cyanate

TABLE XI

Inhibition of $^{14}$C-Glucose Uptake by *Klebsiella pneumoniae*

| Compound | Dosage (ppm) | CPM | | | Avg. | St. Dev. | % Inhibition |
|---|---|---|---|---|---|---|---|
| Control | — | 3189 | 3220 | 3228 | 3219 | 19 | |
|  | — | 3234 | 3240 | 3205 | | | |
| MBT | 5 | 1493 | 1510 | | 1501 | 13 | 53 |
| Oolong tea | 500 | 4345 | 4224 | | 4285 | 85 | −33 |
|  | 250 | 3596 | 3854 | | 3725 | 183 | −16 |
|  | 125 | 3409 | 3646 | | 3527 | 168 | −10 |
|  | 63 | 3409 | 3646 | | 3527 | 168 | −10 |
|  | 31 | 3778 | 3522 | | 3650 | 181 | −13 |
|  | 16 | 3638 | 3617 | | 3627 | 15 | −13 |
| Mimosa | 500 | 3985 | 4003 | | 3994 | 12 | −24 |
| tannin | 250 | 3788 | 4076 | | 3932 | 204 | −22 |
|  | 125 | 3572 | 3701 | | 3636 | 91 | −13 |
|  | 63 | 3520 | 3588 | | 3554 | 48 | −10 |
|  | 31 | 3416 | 3585 | | 3500 | 120 | −9 |
|  | 16 | 3475 | 3619 | | 3547 | 102 | −10 |
| Quebracho | 500 | 3611 | 3332 | | 3472 | 197 | −8 |
| tannin | 250 | 3493 | 3470 | | 3481 | 16 | −8 |
|  | 125 | 3672 | 3514 | | 3593 | 111 | −12 |
|  | 63 | 3363 | 3518 | | 3441 | 110 | −7 |
|  | 31 | 3375 | 3339 | | 3357 | 25 | −4 |
|  | 16 | 3560 | 3376 | | 3468 | 130 | −8 |
| Sumac | 500 | 3331 | 3022 | | 3176 | 219 | 1 |
|  | 250 | 3631 | 3806 | | 3718 | 124 | −16 |
|  | 125 | 3239 | 3366 | | 3347 | 26 | −4 |
|  | 63 | 3399 | 3411 | | 3405 | 9 | −6 |
|  | 31 | 3269 | 3451 | | 3360 | 129 | −4 |
|  | 16 | 3272 | 3357 | | 3314 | 60 | −3 |

TABLE XI-continued

Inhibition of $^{14}$C-Glucose Uptake by *Klebsiella pneumoniae*

| Compound | Dosage (ppm) | CPM | | Avg. | St. Dev. | % Inhibition |
|---|---|---|---|---|---|---|
| Gambier | 500 | 3624 | 3360 | 3492 | 187 | −8 |
|  | 250 | 3340 | 3407 | 3373 | 47 | −5 |
|  | 125 | 3435 | 3386 | 3410 | 34 | −6 |
|  | 63 | 3299 | 3308 | 3304 | 7 | −3 |
|  | 31 | 3126 | 3260 | 3193 | 95 | 1 |
|  | 16 | 3173 | 3265 | 3219 | 65 | 0 |

MBT is methylene bisthiocyanate

These data suggest enhancement of $^{14}$C-glucose utilization, not growth inhibition. It is evident that the mechanism by which teas and tannin inhibit the attachment of microbes to surfaces is not due to microbial growth inhibition.

Tables VIII to XI show that none of the teas and tannins that showed antisessile activity, had biocidal or biostatic activity compared to a known biocide, MBT. Tables X and XI show in fact that the teas and tannins enhance metabolic activity as indicated by negative inhibition of glucose uptake in the presence of the test compounds.

In Table VIII a comparison of CFU/ml for $t_o$ vs. $t_4$ or $t_{24}$ indicates that in the presence of tea extract or tannin, that the values for $t_4$ and $t_{24}$ both increase over $t_o$ values. This indicates that cells exposed to these tannin and tea extract compounds are not only viable, but replicating.

In Tables X and XI, 14-C-glucose uptake is not inhibited by tea or tannin. This suggests that growth of Pseudomonas and Klebsiella is not inhibited. Thus, the tea or tannin compounds are not bacteriostatic.

Two known biocides were tested to determine whether they could be used as positive controls for prevention of bacterial adhesion.

TABLE XII

Attachment of *Pseudomonas aeruginosa* to Plastic microtiter wells

| | Time (min) | CPM | | Average CPM | | Std Dev | |
|---|---|---|---|---|---|---|---|
| Controls | 0 | 1,764 | 1,934 | 2,125 | 1,941 | 180 | |
|  | 30 | 3,293 | 3,653 | 3,378 | 3,441 | 188 | |
|  | 60 | 3,108 | 3,032 | 3,781 | 3,307 | 412 | |
|  | 120 | 3,232 | 3,327 | 2,990 | 3,183 | 174 | |

| Biocide | Time (min) | CPM | | Average CPM | | Std Dev % | Attachment |
|---|---|---|---|---|---|---|---|
| MBT* | 0 | 1,182 | 1,335 | 1,229 | 1,249 | 78 | 64% |
| 50 ppm | 30 | 2,521 | 2,365 | 1,920 | 2,269 | 312 | 66% |
|  | 60 | 3,426 | 3,265 | 3,059 | 3,250 | 184 | 98% |
|  | 120 | 4,228 | 4,700 | 3,302 | 4,077 | 711 | 128% |
| Bronopol** | 0 | 1,275 | 1,239 | 1,264 | 1,260 | 18 | 65% |
| 100 ppm | 30 | 3,211 | 2,732 | 2,592 | 2,845 | 325 | 83% |
|  | 60 | 3,654 | 4,448 | 3,469 | 3,857 | 520 | 117% |
|  | 120 | 1,205 | 4,769 | 5,453 | 3,809 | 2,281 | 120% |

*MBT is Methylene (bis)thiocyanate
**Bronopol is 2-bromo-2-nitropropane-1,3-diol The data shown in Table XII show that MBT at a concentration 10 times higher than that required for biocidal activity (see Table X) had no influence on the attachment of Pseudomonas to the test surfaces of the microtiter plates. It is therefore evident that biocidal activity is not the mechanism that prevents bacterial attachment to surfaces.

All the data presented above show that teas and tannins used at the concentrations tested prevent attachment of microorganisms by a mechanism not related to biocidal or bacteriostatic activity.

Additional studies were conducted to determine whether all tea preparations inhibit microbial attachment. Four teas, processed for different consumer use, were purchased at a local grocery store. These preparations included regular orange pekoe tea purchased as tea bags, decaffeinated orange pekoe tea as tea bags, regular orange pekoe tea prepared as an instant tea, and decaffeinated orange pekoe tea prepared as an instant tea. Those teas purchased in tea bags were extracted as described earlier. The instant teas were tested as purchased. Table XIII shows the results obtained.

TABLE XIII

Attachment of *Pseudomonas aeruginosa*
to plastic microtiter wells
-tea added first

| Treatment | Doseage (ppm) | CPM | | | Avg. | St. Dev. | % Attachment |
|---|---|---|---|---|---|---|---|
| Control | — | 3341 | 3239 | 3605 | 3343 | 174 | |
| Control | — | 3387 | 3086 | 3402 | | | |
| A | 500 | 2359 | 2129 | 2213 | 2234 | 116 | 67 |
| | 250 | 2729 | 2912 | 2784 | 2808 | 94 | 84 |
| | 125 | 2863 | 2818 | 2728 | 2803 | 68 | 84 |
| | 62.5 | 3176 | 2872 | 3092 | 3047 | 157 | 91 |
| B | 500 | 2453 | 2501 | 2745 | 2566 | 157 | 77 |
| | 250 | 2801 | 2714 | 2654 | 2723 | 74 | 81 |
| | 125 | 2874 | 2867 | 2878 | 2873 | 6 | 86 |
| | 62.5 | 2871 | 2645 | 3092 | 2869 | 223 | 86 |
| C | 500 | 266 | 261 | 410 | 312 | 85 | 9 |
| | 250 | 522 | 417 | 486 | 475 | 54 | 14 |
| | 125 | 718 | 739 | 788 | 748 | 36 | 22 |
| | 62.5 | 1703 | 1363 | 1524 | 1530 | 170 | 46 |
| D | 500 | 155 | 145 | 121 | 140 | 18 | 4 |
| | 250 | 400 | 364 | 351 | 372 | 25 | 11 |
| | 125 | 708 | 648 | 595 | 650 | 57 | 19 |
| | 62.5 | 1497 | 1416 | 1567 | 1493 | 76 | 45 |

A is Lipton ® Instant Tea
B is Lipton ® Instant Decaffeinated Tea
C is Lipton ® Orange Pekoe Tea Extract
D is Lipton ® Decaffeinated Orange Pekoe Tea Extract These results demonstrate that the process of making decaffeinated tea does not interfere with the inhibitory action of tea extracts. As seen in Treatment D, decaffeinated orange pekoe tea extract still displays inhibitory action similar to the orange pekoe tea extract. These results further demonstrate that the process of rendering a tea "instant" does interfere with the inhibitory action of the tea extract. This is demonstrated by both instant and decaffeinated instant teas in Treatments A and B.

In order to determine whether other plant materials contain the substances with ability to inhibit the attachment of microbes to surfaces, an unrelated plant material was obtained. In this study iceberg lettuce was purchased, dried, extracted (using 45% ethanol by the techniques described previously), and freeze-dried. The lettuce extract was tested using the attachment assay described previously. The results of this study appear in Table XIV.

TABLE XIV

Attachment of *Pseudomonas aeruginosa*
to plastic microtiter wells
iceberg lettuce extract

| Treatment | Doseage (ppm) | CPM | | | Avg. | St. Dev. | % Attachment |
|---|---|---|---|---|---|---|---|
| -organisms added first | | | | | | | |
| Control | — | 4205 | 4228 | 4134 | 4124 | 131 | |
| Control | — | 3996 | 4327 | 4034 | | | |
| Iceberg | 500 | 3635 | 3717 | 3502 | 3618 | 109 | 88 |
| Lettuce | 250 | 3631 | 3535 | 3987 | 3718 | 238 | 90 |
| Extract | 125 | 3848 | 3868 | 3541 | 3753 | 183 | 91 |
| | 62.5 | 3344 | 3804 | 3902 | 3683 | 298 | 89 |
| -chemicals added first | | | | | | | |
| Control | | 4720 | 4739 | 4787 | 4695 | 172 | |
| Control | — | 4773 | 4802 | 4350 | | | |
| Iceberg | 500 | 3990 | 4108 | 4189 | 4096 | 100 | 87 |
| Lettuce | 250 | 4244 | 4260 | 4392 | 4315 | 69 | 92 |
| Extract | 125 | 4309 | 4076 | 4297 | 4227 | 131 | 90 |
| | 62.5 | 4039 | 4076 | 4262 | 4126 | 119 | 88 |

These results demonstrate that a different plant material that is lower in tannin concentration is not effective at inhibiting the attachment of bacteria.

Further studies were conducted using materials identified as components of teas and/or tannins which were readily available from commercial chemical sources. These compounds were tested and the results of these studies appear in Table XV.

TABLE XV

Attachment of *Pseudomonas aeruginosa*
to plastic microplate wells

| Treatment | Dosage | % Attachment |
|---|---|---|
| -organisms added first | | |
| Quercitrin | 500 | 63 |
| | 15.6 | 90 |
| Rutin hydrate | 500 | 84 |
| | 15.6 | 86 |
| 1-hydroxy-4-keto-2-ionone | 500 | 107 |
| | 15.6 | 96 |
| Quercetrin dihydridate | 500 | 107 |
| | 15.6 | 78 |
| Hesperidirin methyl chalcone | 500 | 103 |
| | 15.6 | 84 |
| (+) catechin | 500 | 91 |
| | 15.6 | 105 |
| (+/−) catechin | 500 | 99 |
| | 15.6 | 99 |
| -chemicals added first | | |
| Quercitrin | 500 | 88 |
| | 15.6 | 94 |
| Rutin hydrate | 500 | 88 |
| | 15.6 | 101 |
| 1-hydroxy-4-keto-2-ionone | 500 | 102 |
| | 15.6 | 80 |
| -organisms added first | | |
| Quercetrin dihydridate | 500 | 102 |
| | 15.6 | 82 |
| Hesperidin methyl chalcone | 500 | 81 |
| | 15.6 | 100 |
| (+) catechin | 500 | 112 |
| | 15.6 | 117 |
| (+/−) catechin | 500 | 91 |
| | 15.6 | 106 |

Table XV demonstrates that these compounds, some known to be biocidal and bactericidal materials, are not effective at inhibiting the attachment of *Pseudomonas aeruginosa*. This also demonstrates that a compound that displays biocidal behavior is not necessarily effective at inhibiting attachment of microbes.

Caffeine, a known component of tea, was also tested to determine whether it was effective at inhibiting microbial attachment. The results of this study appear in Table XVI.

TABLE XVI

Attachment of *Pseudomonas aeruginosa* to Plastic microtiter wells

| Treatment | Doseage (ppm) | CPM | | | Avg. | St. Dev. | % Attachment |
|---|---|---|---|---|---|---|---|
| -organisms added first | | | | | | | |
| Control | — | 3156 | 3083 | 3177 | 3109 | 88 | |
|  | — | 2947 | 3110 | 3181 | | | |
| Caffeine | 200 | 2626 | 2774 | 2594 | 2665 | 96 | 86 |
|  | 100 | 2538 | 2409 | 2788 | 2578 | 192 | 83 |
|  | 50 | 3249 | 2916 | 2934 | 3033 | 188 | 98 |
|  | 25 | 3070 | 2535 | 2860 | 2822 | 269 | 91 |
|  | 12.5 | 3046 | 2886 | 2922 | 2951 | 84 | 95 |
|  | 6.25 | 2817 | 2994 | 3382 | 3064 | 289 | 99 |
| -compounds added first | | | | | | | |
| Control | — | 2713 | 3205 | 4129 | 3099 | | |
|  | — | 2979 | 2846 | 2721 | | | |
| Caffeine | 200 | 2626 | 2774 | 2594 | 2665 | 96 | 86 |
|  | 100 | 2538 | 2409 | 2788 | 2578 | 192 | 83 |
|  | 50 | 3249 | 2916 | 2934 | 3033 | 188 | 98 |
|  | 25 | 3070 | 2535 | 2860 | 2822 | 269 | 91 |
|  | 12.5 | 3046 | 2886 | 2922 | 2951 | 84 | 95 |
|  | 6.25 | 2817 | 2994 | 3382 | 3064 | 289 | 99 |

These results demonstrate that caffeine does not inhibit the attachment of *Pseudomonas aeruginosa*. It can be postulated from these results that the caffeine that may be present in commercially available tea does not contribute to the tea extracts' ability to inhibit the attachment of microbes.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what we claim is:

1. A method for inhibiting the attachment of microbes to the surfaces of aqueous systems while not affecting the viability of said microbes comprising adding to said aqueous systems an effective inhibiting amount of a compound selected from the group consisting of a tea extract and a tannin.

2. The method as claimed in claim 1 wherein said tea extract is selected from the group consisting of nonfermented green tea, semi-fermented tea and fermented black tea.

3. The method as claimed in claim 2 wherein said nonfermented green tea is selected from the group consisting of gun powder tea and pan fried green tea.

4. The method as claimed in claim 2 wherein said semi-fermented tea is selected from the group consisting of Oolong tea, formosa tea, and lotus tea.

5. The method as claimed in claim 2 wherein said fermented black tea is selected from the group consisting of orange pekoe tea, assam tea, darjeeling blend, Turkish tea and Earl Grey tea.

6. The method as claimed in claim 1 wherein said tannin is selected from the group consisting of Quebracho, Mimosa and Gambler.

7. The method as claimed in claim 1 wherein said microbes are bacteria.

8. The method as claimed in claim 7 wherein said bacteria is *Pseudomonas aeruginosa*.

9. The method as claimed in claim 7 wherein said bacteria is *Klebsiella pneumoniae*.

10. The method as claimed in claim 1 wherein said compound is added to said aqueous system in an amount ranging from about 62 parts to about 1000 parts per million parts by the aqueous system.

11. The method as claimed in claim 1 wherein said compound is added to said aqueous system in an amount ranging from about 62 parts to about 125 parts per million parts of the aqueous system.

12. The method as claimed in claim 1 wherein said aqueous system is a papermaking system.

13. The method as claimed in claim 1 wherein said aqueous system is a cooling water system.

* * * * *